United States Patent
Köyer et al.

(10) Patent No.: US 10,030,284 B2
(45) Date of Patent: Jul. 24, 2018

(54) METHOD FOR PRODUCING A STEEL COMPONENT PROVIDED WITH A METALLIC COATING PROVIDING PROTECTION AGAINST COROSION

(71) Applicant: THYSSENKRUPP STEEL EUROPE AG, Duisburg (DE)

(72) Inventors: Maria Köyer, Dortmund (DE); Sascha Sikora, Lünen (DE); Janko Banik, Altena (DE)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 402 days.

(21) Appl. No.: 14/917,356

(22) PCT Filed: Jul. 15, 2014

(86) PCT No.: PCT/EP2014/065127
§ 371 (c)(1),
(2) Date: Mar. 8, 2016

(87) PCT Pub. No.: WO2015/036150
PCT Pub. Date: Mar. 19, 2015

(65) Prior Publication Data
US 2016/0215360 A1    Jul. 28, 2016

(30) Foreign Application Priority Data
Sep. 13, 2013 (EP) .................................. 13184275

(51) Int. Cl.
*C21D 9/46* (2006.01)
*C25D 3/22* (2006.01)
(Continued)

(52) U.S. Cl.
CPC ................ *C21D 9/46* (2013.01); *C21D 1/06* (2013.01); *C21D 1/18* (2013.01); *C21D 1/34* (2013.01);
(Continued)

(58) Field of Classification Search
CPC .......... C21D 9/46; C21D 8/0247; C21D 1/06; C21D 1/34; C21D 6/002; C21D 6/008;
(Continued)

(56) References Cited

U.S. PATENT DOCUMENTS 2,315,740 A    4/1943   Schoonmaker, Jr. et al.
6,143,430 A    11/2000   Miyasaka et al.
(Continued)

FOREIGN PATENT DOCUMENTS

CN     101506402 A    8/2009
DE    102007019196 A1   10/2008
(Continued)

OTHER PUBLICATIONS

English Translation of Int'l Search Report for PCT/EP2014/065127 dated Sep. 30, 2014 (dated Oct. 9, 2014).

*Primary Examiner* — Anthony J Zimmer
(74) *Attorney, Agent, or Firm* — thyssenkrupp North America, Inc.

(57) ABSTRACT

Methods for producing steel components with well-adhering metallic coatings that provide protection from corrosion offer flexibility in processing qualities. In one example, a flat steel product comprising a steel material that is hardenable by quenching in a hot forming operation and that has a yield point of 150-1100 MPa and a tensile strength of 300-1200 MPa may be coated electrolytically with a thin zinc layer. From the flat steel product, a blank may then be obtained that is heated directly to at least 800° C. and then formed into the steel component. Alternatively, the blank may initially be (Continued)

formed into the steel component and then heated to at least 800° C. Either way, the steel component may then be hardened by sufficiently rapid cooling from a sufficiently high temperature.

20 Claims, 2 Drawing Sheets

(51) Int. Cl.

| | |
|---|---|
| *C21D 5/02* | (2006.01) |
| *C25D 5/48* | (2006.01) |
| *C25D 5/50* | (2006.01) |
| *C21D 1/18* | (2006.01) |
| *C21D 1/42* | (2006.01) |
| *C21D 8/00* | (2006.01) |
| *C21D 1/06* | (2006.01) |
| *C21D 1/34* | (2006.01) |
| *C21D 1/74* | (2006.01) |
| *C21D 6/00* | (2006.01) |
| *C21D 8/02* | (2006.01) |
| *C22C 38/02* | (2006.01) |
| *C22C 38/06* | (2006.01) |
| *C22C 38/28* | (2006.01) |
| *C25D 7/00* | (2006.01) |
| *C25D 5/36* | (2006.01) |
| *C25D 7/06* | (2006.01) |
| *C21D 1/673* | (2006.01) |
| *C25D 5/02* | (2006.01) |

(52) U.S. Cl.
CPC .............. *C21D 1/42* (2013.01); *C21D 1/74* (2013.01); *C21D 6/002* (2013.01); *C21D 6/008* (2013.01); *C21D 8/005* (2013.01); *C21D 8/0205* (2013.01); *C21D 8/0221* (2013.01); *C21D 8/0247* (2013.01); *C22C 38/02* (2013.01); *C22C 38/06* (2013.01); *C22C 38/28* (2013.01); *C25D 3/22* (2013.01); *C25D 5/028* (2013.01); *C25D 5/48* (2013.01); *C25D 5/50* (2013.01); *C25D 7/00* (2013.01); *C21D 1/673* (2013.01); *C25D 5/36* (2013.01); *C25D 7/0621* (2013.01); *Y02P 10/253* (2015.11)

(58) Field of Classification Search
CPC ...... C21D 8/0205; C21D 8/0221; C21D 1/74; C21D 8/005; C21D 1/18; C21D 1/42; C21D 1/673; C22C 38/02; C22C 38/06; C22C 38/28; C25D 7/00; C25D 5/028; C25D 5/48; C25D 3/22; C25D 5/50; C25D 7/0621; C25D 5/36; Y02P 10/253
See application file for complete search history.

(56) References Cited

U.S. PATENT DOCUMENTS

| | | |
|---|---|---|
| 2009/0308499 A1 | 12/2009 | Scott et al. |
| 2012/0164472 A1 | 6/2012 | Kuhn et al. |
| 2012/0325377 A1 | 12/2012 | Imai et al. |

FOREIGN PATENT DOCUMENTS

| | | |
|---|---|---|
| DE | 102010056265 B3 | 5/2012 |
| EP | 1439240 A1 | 7/2004 |
| EP | 2248927 A1 | 11/2010 |

METHOD FOR PRODUCING A STEEL COMPONENT PROVIDED WITH A METALLIC COATING PROVIDING PROTECTION AGAINST COROSION

CROSS REFERENCE TO RELATED APPLICATIONS

This application is a U.S. National Stage Entry of International Patent Application Serial Number PCT/EP2014/065127 filed Jul. 15, 2014, which claims priority to European Patent Application No. EP 13184275.9 filed Sep. 13, 2013, the entire contents of both of which are incorporated herein by reference.

FIELD

The present disclosure relates to methods for producing steel components with metallic coatings to protect against corrosion.

BACKGROUND

References here to "flat steel products" are to steel strips, steel sheets, or blanks and the like that are obtained from them.

In order to offer the combination of low weight, maximum strength, and protective effect that is required in modern bodywork construction, components made by hot press forming from high-strength steels are nowadays used in those areas of the bodywork that may be subject to particularly high loads in the event of a crash.

In the case of hot press hardening, also called hot forming, steel blanks divided off from cold-rolled or hot-rolled steel strips are heated to a working temperature, which is generally above the austenitizing temperature of the respective steel, and in the heated state are placed into the die of a forming press. In the course of the forming that is subsequently carried out, the sheet blank or the component formed from it undergoes rapid cooling as a result of contact with the cool die. The cooling rates here are set so as to produce hardened microstructure in the component.

One typical example of a steel suitable for hot press hardening is known under the designation "22MnB5" and is found in the 2004 German steel codex [Stahlschlüssel] under material number 1.5528.

The advantages of the known manganese-boron steels, which are particularly suitable for hot press hardening, are balanced in practice by the disadvantage that steels containing manganese are generally not resistant to wet corrosion and are difficult to passivate. This tendency, high in comparison to that of less highly alloyed steels on exposure to elevated chloride ion concentrations, toward corrosion which, while locally limited, is nevertheless intense, makes it difficult, particularly in bodywork construction, to use steels that belong to the materials group of the high-alloy steel sheets. Moreover, steels containing manganese have a tendency toward surface corrosion, thereby likewise restricting the spectrum of their usefulness.

There are various proposals in the prior art aimed at reducing the uptake of hydrogen by manganese-containing steels during the thermally conditioned state, or providing such steels with a metallic coating that protects the steel from corrosive attack. A distinction is made here between active and passive anticorrosion systems.

Active anticorrosion systems are produced customarily by continuous application of a zinc-containing anticorrosion coating. Passive anticorrosion systems, on the other hand, are typically produced by application of an aluminum-based coating which affords a good barrier effect with respect to corrosive attacks.

With known metallic, zinc-containing anticorrosion coatings there are negative and positive aspects.

Steel sheets with zinc-based anticorrosion coatings, which have a high zinc fraction in the region of typically at least 85 wt % and at most 98 wt %, and which are applied in a hot dip operation to a steel strip for coating, offer relatively long active corrosion protection. Unsatisfactory aspects of the hot dip galvanizing, however, include certain restrictions on the processing of the steel blanks coated in this way. The reason is that the zinc constituents are diminished if blank temperatures are too high; and/or the corrosion resistance of the blank or of the steel component is reduced on excessively long heating of the zinc-coated steel blank or of the component formed from it. Furthermore, other constituents of the zinc melt, which are often elements with affinity for oxygen, such as aluminum, for example, give rise to the formation of hard oxides on the surface of the zinc-based anticorrosion coating. This oxide layer, while indeed providing protection from evaporation of the zinc, is nevertheless of only limited weldability. In general, therefore, the steel component is blasted in order to remove the oxides that have formed (typically aluminum oxides). Furthermore, zinc-based coatings of this kind, on account of their low melting temperature, have a tendency toward cracking, and for this reason only the indirect hot forming operation, which is cost-intensive, can be used for processing flat steel products coated accordingly.

"Galvannealed" steel sheets, whose zinc coating has been converted by heat treatment into a zinc-iron alloy layer, were developed specifically for the direct hot forming operation for the purpose of obtaining active corrosion protection. Typically, however, a zinc-iron coating of this kind contains a greater or lesser number of other constituents or impurities from the zinc melt. One of the disadvantages of this coating is the likewise restricted operating window. Excessively high temperatures cause combustion of the zinc constituents; and/or excessively long heating, again, reduces the corrosion resistance. Furthermore, the other constituents of the zinc melt, which are often elements with affinity for oxygen, such as aluminum, for example, give rise to the formation of hard oxides on the surface of the anticorrosion coating. Generally, therefore, the component is blasted in order to remove the resultant oxides (generally aluminum oxides). There is likewise a risk of cracking caused by zinc. On account of the hard oxides formed by the elements with oxygen affinity on heating, moreover, there may be a somewhat increased friction coefficient.

Aluminum-silicon coatings, on the other hand, offer a relatively wide processing window. This anticorrosion coating is applied in a hot dip coating operation to the flat steel product. A hard intermetallic phase is formed between the steel substrate and the coating itself. On the basis of this hard intermetallic phase, the cold forming of an AlSi-coated steel sheet is possible only with restrictions, since the coating will undergo partial flaking, and unwanted oxidation and/or edge decarburization occurs at the flaking sites. Normally, therefore, AlSi-coated, press-hardenable steel sheets are used only in a direct hot forming operation. There are therefore certain production processes, however, that are not possible with this coating. Furthermore, an AlSi coating is of very limited suitability for rapid heating operations, since such operations lead to unwanted melting. Following conventional heating (typically oven heating), there are high friction coefficients during the forming operation, which in some cases adversely affect the forming characteristics.

Metallic anticorrosion coatings applied in a hot dip process generally possess disadvantages in the event of subsequent rapid heating procedures, especially in the case of heating by means of laser radiation or infrared technology. The reason is that in this case the formation of liquid phases, and a consequently impaired absorption, can be frequently observed. As a result, therefore, neither homogeneous heating nor consistent layer properties can generally be obtained.

Therefore, a need exists for methods that are simple to carry out in practice and that allow for production of comparatively low complexity of a steel components having a well-adhering metallic coating that protects against corrosion.

Figure 1:
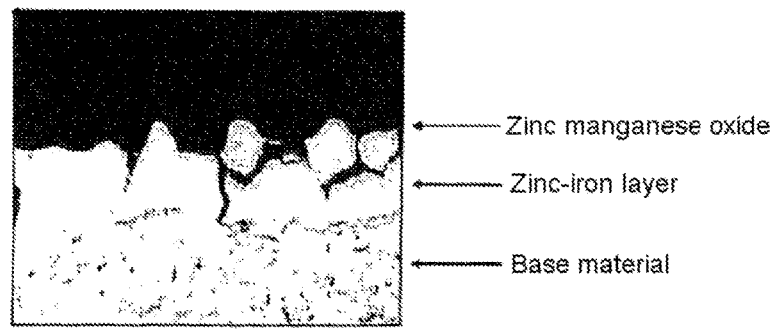
FIG. 1 is a close-up of a polished section of an example sample of an electrolytically galvanized flat manganese-boron steel product after an annealing treatment.

One example object of the present disclosure is to specify methods by which flat steel products can be adequately protected from corrosion. Such methods allow for a broad field of processing variants. Moreover, the focus of the present disclosure is not necessarily on long-lasting corrosion protection, but more so on high flexibility of processing characteristics.

One example method of the present disclosure relates to the forming of the steel component by 'direct hot forming' (direct press hardening). Another example method concerns the forming of the steel component in an 'indirect method' (indirect press hardening), in which a coated steel blank is first cold-formed, then heated to austenization temperature, and subsequently converted into the tempered or hardened microstructure state by rapid cooling.

In a method of the invention for producing a steel component provided with a metallic coating providing protection from corrosion, first of all a flat steel product, i.e., a steel strip or steel sheet, is provided, made from steel material which is hardenable by quenching in a hot forming operation and which has a yield point of 150-1100 MPa and a tensile strength of 300-1200 MPa.

This steel material may typically be a high-strength manganese-boron steel in conventional composition. Accordingly, besides iron and unavoidable impurities, the steel processed in accordance with the invention may comprise (in wt %) 0.2-0.5% C, 0.5-3.0% Mn, 0.002-0.004% B, and also, optionally, one or more "Si, Cr, Al, Ti" group elements in following amounts: 0.1-0.3% Si, 0.1-0.5% Cr, 0.02-0.05% Al, 0.025-0.04% Ti.

The flat steel product used preferably is a recrystallizing cold strip, it having emerged that a steel strip of this kind can be coated comparatively inexpensively in an electrolytic coating unit.

Through electrolytic coating, a very uniformly thin and very pure zinc layer is applied to the flat steel product acquired and provided accordingly. The electrolytic coating here is performed in such a way that the zinc layer has an average layer thickness of less than 5 μm, preferably in the range of 1-4 μm, more preferably in the range of 2-4 μm. The particularly high uniformity in the layer thickness (i.e., the very low variation in thickness over the width or length of the substrate) results in particular from the low layer thickness, since disuniformities in the layer thickness occur to an increased extent only at relatively high layer thicknesses. An average layer thickness of less than 1 μm ought not to be established, since otherwise there may be local defects, i.e. uncoated areas on the surface of the flat steel product.

In view of the very low thickness of the zinc layer, less liquid zinc is formed in the subsequent hot forming, since iron (Fe) is able to diffuse from close to the substrate into the zinc layer over the entire thickness of the layer and thoroughly react with the zinc. The zinc layer is therefore converted substantially completely into a Zn—Fe alloy.

The thin zinc layer deposited electrolytically serves in particular to protect the steel substrate from scaling and also for improved "lubricity" (owing to lower friction) during the hot forming. Formed on the zinc layer is zinc oxide, which, unlike aluminum oxide, which is very brittle and possesses poor lubricity properties, results in substantially improved lubricity. In the tribological system, accordingly, the coefficients of friction are reduced and hence the forming properties are improved.

In the context of the method of the invention, the electrolytic deposition of the zinc layer is performed preferably as a continuous strip coating operation.

The thin zinc layer serves additionally to reduce or even prevent formation of red rust during transport of a steel sheet which has already been hot-formed, or of a coil which has already been heat-treated.

In one advantageous refinement of the method of the invention, the electrolytic coating is performed in such a way that the zinc coating is applied with a different layer thickness per side of flat steel product. As a result, the zinc coating can be brought into line with the requirement.

In another advantageous refinement of the method of the invention, the zinc coating is applied only to one side of the flat steel product. This variant as well constitutes the zinc coating being brought into line with requirements.

In a further advantageous refinement of the method of the invention, the heating of the blank or of the steel component is carried out in an oven atmosphere which comprises between 5 vol % and 25 vol % oxygen, preferably between 15 vol % and 22 vol % oxygen. A further optimization for reducing the uptake of hydrogen comes about if in accordance with a further refinement of the method of the invention, the heating of the blank or of the steel component is carried out in an oven atmosphere comprising dried gas, preferably dried air. In this way the oven atmosphere is taken artificially to a low dew point In a further advantageous refinement of the method of the invention, the heating of the blank or of the steel component is or comprises a partially different heat treatment of the blank or of the steel component. This partial heat treatment of the blank or of the steel component takes place preferably by means of inductive or laser-assisted heating. By this means it is possible, for example, to generate regions having different strength properties on the steel component to be produced.

FIG. 1 shows by way of example a section of an electrolytically galvanized flat manganese-boron steel product after an annealing treatment. As a result of the heat treatment, iron (Fe) and manganese (Mn) have diffused into the zinc layer deposited on the base material (manganese-boron steel), as a result of which the zinc layer has been converted into a zinc-iron layer and, over that layer, a very thin zinc-manganese oxide layer. In the case of base materials without manganese, only a zinc oxide layer will be formed on the zinc-iron layer. The zinc oxide or zinc-manganese oxide layer is preferably removed, by means of a blasting operation, for example, in order to improve the coatability of the steel component formed from the flat steel product coated in accordance with the invention.

Figure 2:
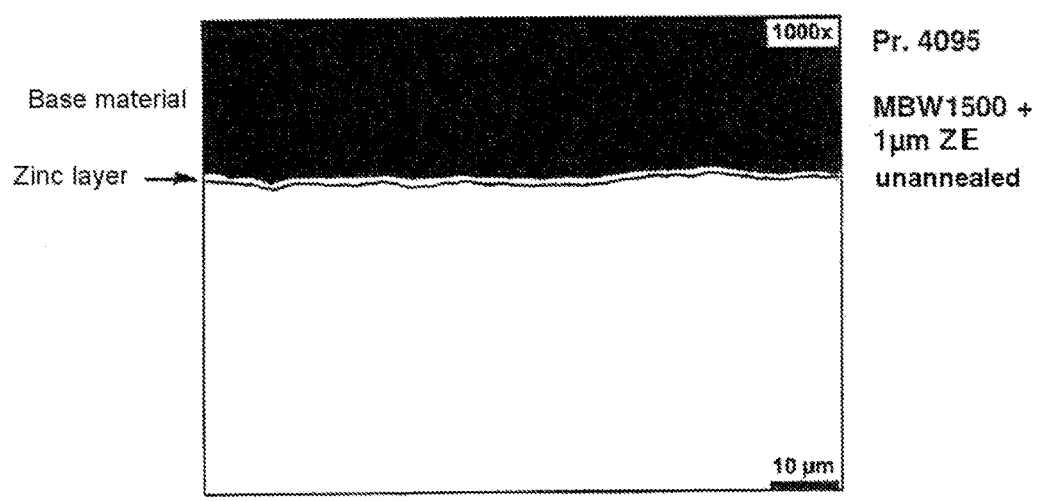
FIG. 2 is a close-up of a polished section of an example sample of an unannealed flat manganese-boron steel product coated according to the present disclosure, wherein an electrolytically-applied zinc layer has an average layer thickness of 1 μm.
Figure 3:
FIG. 3 is a close-up of a polished section of an example sample of an unannealed flat manganese-boron steel product coated according to the present disclosure, wherein an electrolytically-applied zinc layer has an average layer thickness of 3 μm.
Figure 4:
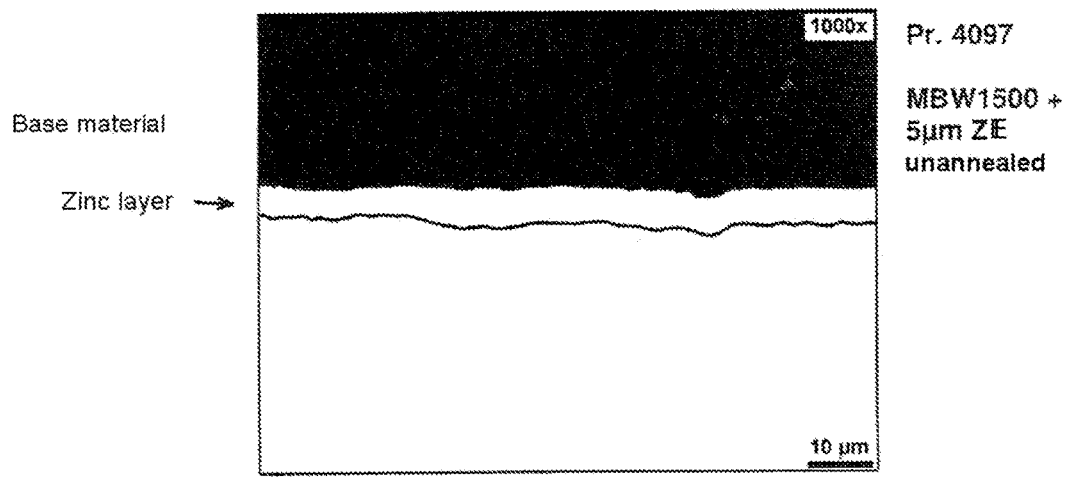
FIG. 4 is a close-up of a polished section of an example sample of an unannealed flat manganese-boron steel product coated according to the present disclosure, wherein an electrolytically-applied zinc layer has an average layer thickness of 5 μm.

FIGS. 2 to 4 depict three samples of a manganese-boron steel sheet, coated in accordance with the invention, in perpendicular fashion. Each steel sheet has been provided with a thin zinc coating which was applied electrolytically and has an average layer thickness of 1 µm, 3 µm, or 5 µm. The samples depicted show the electrolytically galvanized manganese-boron steel sheet in the unannealed state.

The samples, depicted as light micrographs, reveal that at an average zinc layer thickness of 1 µm, local defects have arisen in the coating (see FIG. 2), whereas at an average layer thickness of 3 µm, a coherent, uniform zinc coating has already been achieved (see FIG. 3). At an average layer thickness of 5 µm as well, the layer thickness distribution of the zinc coating is uniform (see FIG. 4).

In order to obtain the low average layer thickness of the zinc coating, in accordance with the invention, the operating parameters of the electrolytic coating are set accordingly. The "operating parameters" of the electrolytic coating include, for example, the nature of the flow on the substrate to be coated, the flow rate of the electrolyte, the orientation of electrolyte flow in relation to the particular steel substrate being coated, the current density, the temperature, the pH of the electrolyte, and the dwell time or duration of treatment of the substrate being coated in the electrolysis cell. In accordance with the invention, these parameters should be harmonized with one another in such a way that the zinc coating is established with the layer thickness mandated in accordance with the invention. For this purpose, the stated variables can each be varied as follows, depending on the particular plant technology available:

the nature of the flow on the substrate to be coated: laminar or turbulent; coating outcomes are good in the case both of laminar and of turbulent flow of the electrolyte on the flat steel product to be coated. With many coating units available in practice, however, a turbulent flow will be preferred on account of the more intensive exchange between electrolyte and steel substrate in practice, flow rate of the electrolyte: 0.1-6 m/s;

orientation of the electrolyte flow in relation to the particular steel substrate being coated: the steel substrate can be coated both in vertically and in horizontally aligned cells;

current density: 10-140 A/dm$^2$;

temperature of the electrolyte: 30-70° C.;

pH of the electrolyte: 1-3.5;

duration of passage/dwell time in the electrolyte cell: 1-15 min.

A steel blank is then formed from the flat steel product coated inventively. This blank can be divided off in conventional manner from the particular steel strip or steel sheet. Also conceivable, however, is for the flat steel product at the coating stage already to possess the shape required for subsequent shaping to the component—that is, to correspond to the blank. The steel blank provided accordingly, inventively, with the very thin, substantially pure zinc coating is subsequently heated, in accordance with the first variant of the method of the invention, to a blank temperature of not less than 800° C., and at that stage the steel component is formed from the heated blank. Conversely, in accordance with the second method variant, the steel component is first of all at least preformed from the blank, and only thereafter is the heating carried out to a component temperature of at least 800° C. In the course of the heating to the blank or component temperature, respectively, conversion to a Zn—Fe alloy takes place in the thin zinc layer applied beforehand.

According to the first variant of the method of the invention, the blank, heated in accordance with the invention to a temperature of at least 800° C., is formed into the steel component. This can be done, for example, by conveying the blank, immediately after heating, to the respective forming die used. On route to the forming die, the cooling of the blank is generally unavoidable, and so in the case of such hot forming subsequent to heating, the temperature of the blank on entry into the forming die is typically lower than the blank temperature at the exit from the oven. In the forming die, the steel blank is formed into the steel component in a conventional way.

Where forming is carried out at temperatures sufficiently high for the formation of hardened or tempered microstructure, the resulting steel component, starting from the respective temperature, can be cooled at a cooling rate sufficient for tempered or hardened microstructure to come about in its steel substrate. This process can be carried out particularly economically in the hot-forming die itself.

Accordingly, the method of the invention, on account of the insensitivity of the inventively coated flat steel product to cracks in the steel substrate and abrasion, is particularly suitable for single-stage hot press forming, which involves the steel component being hot-shaped and cooled, utilizing the heat from the preceding heating to the blank temperature, in one go in a die.

In the case of the second method variant, the blank is first formed and then the steel component is formed from this blank without an intervening heat treatment. The forming of the steel component in this case takes place typically in a cold forming process, in which one or more cold-forming operations are carried out. The degree of cold shaping here may be such that the resulting steel component is formed to a substantially fully finished state. It is also conceivable, however, for the first shaping to be carried out as preforming and for the steel component to be formed to a finished state in a forming die after heating. This forming to a finished state can be combined with the hardening process, if the hardening is carried out as form-hardening in a suitable forming die. In that case the steel component is placed into a die which models its finished final form, and is cooled sufficiently quickly for the desired hardened or tempered microstructure to develop. In this way, the form-hardening enables particularly good shape retention on the part of the steel component. The alteration in shape during form-hardening is usually slight.

Irrespective of which of the two variants of the method of the invention are employed, neither the shaping nor the cooling that is needed for the hardened or tempered microstructure to develop need be carried out in a special way different from the prior art. Instead, known methods and available apparatus can be employed for this purpose. On account of the production, inventively, of a very thin, relatively uniform, and substantially pure zinc layer on the flat steel product intended for forming, there is no risk, in the case of hot shaping or of forming at elevated temperatures, of any softening of the zinc coating and, accordingly, instances of sticking of coating material to the die surfaces that come into contact with said material.

In order to ensure an optimum outcome to the electrolytic coating, the flat steel product prior to electrolytic coating can be subjected in a conventional way to a pretreatment wherein the surface of the steel substrate is treated in such a way that it possesses a surface condition optimally prepared for the coating subsequently carried out with the anticorrosion coat. For this purpose, one or more of the pretreatment steps listed below can be run through:

alkaline degreasing of the flat steel product in a degreasing bath. Typically the degreasing bath contains 5-150 g/l, more particularly 10-20 g/l, of a surfactant cleaner. The temperature of the degreasing bath here is 20-85° C., with particularly good activity being established at a bath temperature of 65-75° C. This is especially the case when degreasing takes place electrolytically, and in that event particularly good cleaning outcomes are obtained if at least one cycle is run through in which the sample is given anodic and cathodic polarities. In this case it may prove advantageous if in the alkaline cleaning there is not only electrolytic dip-degreasing, but spray/brush cleaning with the alkaline medium is carried out prior to the electrolytic cleaning.

rinsing of the flat steel product, this rinsing being carried out by means of white water or fully demineralized water.

pickling of the flat steel product. In pickling, the flat products are passed through an acid bath which flushes the oxide layer from them without attacking the surface of the flat steel product itself. Through the controlled step of pickling, the removal of oxide is guided in such a way that the resulting surface is set up favorably for electrolytic strip galvanizing. After pickling has taken place, a further rinse of the flat steel product may be useful in order to remove remnants of the acid used in pickling from the flat steel product.

where rinsing of the flat steel product is carried out, the flat steel product may be brushed mechanically during the rinse in order to remove from its surface stubborn particles as well.

liquids still present on the pretreated flat steel product are removed customarily by means of squeeze rolls before the product enters the electrolyte bath.

Practical examples of pretreatments leading to a particularly good outcome to the electrolytic coating include the following variants:

EXAMPLE

An annealed cold strip of grade 22MnB5 (1.5528) is subjected to alkaline spray degreasing and also to electrolytic degreasing. The degreasing bath contains, in a concentration of about 15 g/l, a commercial cleaner which has more than 25% of sodium hydroxide, 1-5% of a fatty alcohol ether, and 5-10% of an ethoxylated, propoxylated, and methylated C12-18 alcohol. The bath temperature is about 65° C. The dwell time in the spray degreasing is about 4-6 s. This is followed by brush cleaning. In its further course, the strip is degreased electrolytically in a dwell time of about 3 s with anodic and cathodic polarities and with a current density of 15 A/dm$^2$. This is followed by multi-stage rinsing with fully demineralized water at room temperature, with brushes deployed. The dwell time in the rinse is about 2-4 s. Thereafter a hydrochloric acid pickling is run through (20 g/l; temperature 35-38° C.) for a dwell duration of about 10-12 s. After a rinse with fully demineralized water, lasting about 7-9 s, the metal sheet passes through a squeeze apparatus and is then transferred into the horizontally aligned electrolysis cell. In this cell the steel strip or sheet is coated in accordance with the invention. Operating parameters set for this treatment were as follows:

Zn content of electrolyte: 80-150 g/l;
Na2SO4 content of electrolyte: 23-28 g/l;
pH of electrolyte: 1.4-1.6;
temperature of electrolyte: 60-70° C.;
current density: 10-40 A/dm$^2$;
flow rate of electrolyte: 0.1-6 m/s;
run-through/treatment time in electrolyte cell: 2-8 min.

The flat steel product emerging from the electrolytic coating line can be given multi-stage rinsing with water and fully demineralized water at room temperature. Subsequently the flat steel product then also passes through a drying section.

EXAMPLE 2

Hot strip (pickled) of grade 22MnB5 (1.5528) is subjected to alkaline spray degreasing and to electrolytic degreasing. The degreasing bath contains, in a concentration of 20 g/l, a cleaner which comprises 1-5% C12-C18 fatty alcohol polyethylene glycol butyl ether and 0.5-2% of potassium hydroxide. The bath temperature is about 75° C. The dwell time in the horizontal spray rinse is about 10-12 s. This is followed by dual brush cleaning. In its further course, the strip is degreased electrolytically in a dwell time of about 8-10 s with anodic and cathodic polarities and with a current density of about 10 A/dm$^2$. This is followed by multi-stage rinsing with fully demineralized water at room temperature, with brushes deployed. The dwell time in the rinse is about 2-4 s. Thereafter a hydrochloric acid pickling is run through (100 g/l; room temperature) for a dwell duration of about 26-28 s. After a combined brush and spray rinse with fresh water the metal sheet passes through a squeeze apparatus and is then transferred into the horizontally aligned electrolysis cell, in which the deposition of the zinc coating takes place in accordance with the invention. Operating parameters set for this treatment were as follows:

Zn content of electrolyte: 100-130 g/l;
Na2SO4 content of electrolyte: 23-27 g/l;
pH of electrolyte: 1.4-1.6;
temperature of electrolyte: 60-75° C.;
current density: 20-40 A/dm$^2$;
flow rate of electrolyte: 0.1-6 m/s;
run-through/treatment time in electrolyte cell: 2-6 min.

Following the electrolytic coating, the flat steel product, now coated inventively, is subjected to two-stage rinsing with water and fully demineralized water at 40° C. After that the flat steel product runs through a drying section with air-circulation fan, with a circulating-air temperature of 75° C.

Optimum working results come about, in the context of the examples given above, if the blank or component temperature, in a manner known per se, amounts to not more than 920° C., more particularly 830-905° C. This is especially the case when the forming of the steel component is carried out as hot forming after heating to the blank or component temperature in such a way that the heated blank ("direct" process) or the heated steel component ("indirect" process) is inserted, with acceptance of a certain temperature loss, into the forming die that is subsequently used in each case. The final hot forming in each case can be carried out with particular operational reliability when the blank or component temperature is 850-880° C.

In a manner known per se, heating to the blank or component temperature may take place in passage through a through-travel oven. Typical annealing times here are in the range of 3-15 min. Alternatively, however, it is also possible for heating to be performed by means of a heating apparatus which operates inductively or conductively. This permits particularly rapid and precise heating to the particular temperature mandated.

In the course of heating, the oxygen content of the oven atmosphere ought to be between 15% and 25%, preferably 19% and 21%. Further optimization for reducing the uptake of hydrogen by the steel substrate coated in accordance with the invention can be accomplished by introduction of dry gases, preferably dried air. As a result, the oven atmosphere is brought artificially to a low dew point.

The present invention therefore affords the following advantages:
- unwanted coating constituents, such as elements with affinity for oxygen, for example, particularly aluminum, can be excluded in the case of the approach according to the invention;
- application of a pure zinc layer;
- a boundary layer (intermetallic phase), of the kind which forms in hot dip coating, is very largely prevented;
- prevention of scaling of the base material while being heated;
- a more uniform layer thickness can be obtained than in the case of hot dip coating;
- very low zinc layer thicknesses can be applied, thereby reducing the liquefaction of zinc during hot forming and hence the tendency toward cracking;
- in a simple way, coating on one side only, and coating on both sides, with different layer thickness on each side of the material, can be realized;
- possibility of configuring the desired anticorrosion effect in accordance with requirements (from no anticorrosion effect through to active corrosion control);
- reduced coefficients of friction come about in the case of the direct hot forming with better formability;
- the low zinc layer thickness allows the use of rapid heating methods, particularly for partial heat treatment and/or partial press hardening;
- very short diffusion pathways allow partial diffusion of iron into the zinc layer;
- cold formability is good for partially indirect hot forming operations or completely indirect hot forming operations;
- high suitability for tailored welded blanks, since there is no need for the zinc coating to be removed in the weld seam area, in comparison to AlSi coating;
- no need for an inert gas atmosphere during heating of the coated flat steel product—formation of oxide is acceptable;
- high coatability with or without blasting beforehand;
- possible saving of anticorrosion oil for dispatch of the component.

The invention claimed is:

1. A method for producing steel components with metallic coatings that protect against corrosion, the method comprising:
    providing a flat steel product made from steel material that is hardenable by quenching in a hot forming operation and that has a yield point of 150-1100 MPa and a tensile strength of 300-1200 MPa;
    electrolytically coating the flat steel product with an anticorrosion coating consisting of zinc and unavoidable impurities, wherein the anticorrosion coating has an average thickness of less than 5 μm;
    heating a blank formed from the flat steel product that has been electrolytically coated to a blank temperature of at least 800 degrees Celsius;
    forming a steel component from the blank in a forming die; and
    hardening the steel component by cooling the steel component from a temperature at which the steel component is in a state suitable for formation of a tempered or hardened microstructure at a cooling rate sufficient for the formation of the tempered or hardened microstructure.

2. The method of claim 1 wherein electrolytically coating the flat steel product comprises electrolytically coating a first side and a second side of the flat steel product, wherein the anticorrosion coating applied to the first side has a first thickness and the anticorrosion coating applied to the second side has a second thickness that is different than the first thickness.

3. The method of claim 1 wherein only one side of the flat steel product is electrolytically coated with the anticorrosion coating.

4. The method of claim 1 wherein the flat steel product is electrolytically coated so that the average thickness of the anticorrosion coating is 1-4 μm.

5. The method of claim 1 wherein the flat steel product is electrolytically coated so that the average thickness of the anticorrosion coating is 2-4 μm.

6. The method of claim 1 wherein the heating of the blank is carried out in an oven atmosphere that comprises 15-22 percent by volume oxygen.

7. The method of claim 1 wherein the heating of the blank is carried out in an oven atmosphere that comprises dried gas.

8. The method of claim 1 wherein the heating of the blank is uneven such that one region of the blank is heated differently than another region of the blank, wherein the heating of the blank occurs by way of inductive heating or laser-assisted heating.

9. The method of claim 1 wherein the flat steel product provided is a recrystallizing cold strip.

10. A method for producing steel components with metallic coatings that protect against corrosion, the method comprising:
    providing a flat steel product made from steel material that is hardenable by quenching in a hot forming operation and that has a yield point of 150-1100 MPa and a tensile strength of 300-1200 MPa;
    electrolytically coating the flat steel product with an anticorrosion coating consisting of zinc and unavoidable impurities, wherein the anticorrosion coating has an average thickness of less than 5 μm;
    forming a steel component in a forming die from a blank formed from the flat steel product;
    heating the steel component to a component temperature of at least 800 degrees Celsius; and
    hardening the steel component by cooling the steel component from a temperature at which the steel component is in a state suitable for formation of a tempered or hardened microstructure at a cooling rate sufficient for the formation of the tempered or hardened microstructure.

11. The method of claim 10 wherein the flat steel product is electrolytically coated so that the average thickness of the anticorrosion coating is 1-4 μm.

12. The method of claim 10 wherein the flat steel product is electrolytically coated so that the average thickness of the anticorrosion coating is 2-4 μm.

13. The method of claim 10 further comprising forming the steel component to a form-finished state after heating the steel component to the component temperature of at least 800 degrees Celsius.

14. The method of claim 10 wherein electrolytically coating the flat steel product comprises electrolytically coating a first side and a second side of the flat steel product, wherein the anticorrosion coating applied to the first side has a first thickness and the anticorrosion coating applied to the second side has a second thickness that is different than the first thickness.

15. The method of claim 10 wherein only one side of the flat steel product is electrolytically coated with the anticorrosion coating.

16. The method of claim 10 wherein the heating of the steel component is carried out in an oven atmosphere that comprises 5-25 percent by volume oxygen.

17. The method of claim 10 wherein the heating of the steel component is carried out in an oven atmosphere that comprises dried air.

18. The method of claim 10 wherein the heating of the steel component is uneven such that one region of the steel component is heated differently than another region of the steel component.

19. The method of claim 18 wherein the heating of the steel component occurs by way of inductive heating or laser-assisted heating.

20. The method of claim 10 wherein the flat steel product provided is a recrystallizing cold strip.

* * * * *